US011630753B2

(12) United States Patent
Harwood et al.

(10) Patent No.: US 11,630,753 B2
(45) Date of Patent: Apr. 18, 2023

(54) MULTI-LEVEL WORKFLOW SCHEDULING USING METAHEURISTIC AND HEURISTIC ALGORITHMS

(71) Applicant: EMC IP Holding Company LLC, Hopkinton, MA (US)

(72) Inventors: John S. Harwood, Boston, MA (US); Robert Anthony Lincourt, Jr., Franklin, MA (US); William Jeffery White, Plano, TX (US); Said Tabet, Austin, TX (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/381,452

(22) Filed: Jul. 21, 2021

(65) Prior Publication Data
US 2023/0023427 A1 Jan. 26, 2023

(51) Int. Cl.
  *G06F 11/34* (2006.01)
  *G06F 9/30* (2018.01)
(52) U.S. Cl.
  CPC ........ *G06F 11/3466* (2013.01); *G06F 9/3005* (2013.01); *G06F 11/3414* (2013.01)
(58) Field of Classification Search
  None
  See application file for complete search history.

(56) References Cited

U.S. PATENT DOCUMENTS

| | | | | |
|---|---|---|---|---|
| 5,930,512 A | * | 7/1999 | Boden | G06Q 10/06 717/102 |
| 9,588,685 B1 | * | 3/2017 | Watson | G06F 3/0655 |
| 2004/0078258 A1 | * | 4/2004 | Schulz | G06Q 10/06 717/104 |
| 2004/0083448 A1 | * | 4/2004 | Schulz | G06Q 10/0633 717/104 |
| 2004/0187089 A1 | * | 9/2004 | Schulz | G06Q 10/06 717/104 |
| 2018/0308068 A1 | * | 10/2018 | Hamilton | G06Q 10/1097 |
| 2019/0279126 A1 | * | 9/2019 | Erramilli | G06Q 10/0633 |
| 2020/0104230 A1 | * | 4/2020 | Hasija | G06F 11/3072 |
| 2020/0111041 A1 | * | 4/2020 | Levine | G06Q 10/06316 |
| 2020/0241994 A1 | * | 7/2020 | March | G06F 16/178 |

* cited by examiner

*Primary Examiner* — Qing Chen
(74) *Attorney, Agent, or Firm* — Chamberlain, Hrdlicka, White, Williams & Aughtry

(57) ABSTRACT

Techniques described herein relate to a method for deploying workflows. The method may include receiving, by a global orchestrator of a device ecosystem, a request to execute a workflow; decomposing, by the global orchestrator, the workflow into a plurality of workflow portions; executing, by the global orchestrator, a metaheuristic algorithm to generate a result comprising a plurality of domains of the device ecosystem in which to execute the plurality of workflow portions; and providing, by the global orchestrator, the plurality of workflow portions to respective local orchestrators of the plurality of domains based on the result of executing the metaheuristic algorithm.

18 Claims, 5 Drawing Sheets

MULTI-LEVEL WORKFLOW SCHEDULING USING METAHEURISTIC AND HEURISTIC ALGORITHMS

BACKGROUND

Computing devices often exist in complex ecosystems of devices in which data exists and/or is generated. Such data may be used and/or operated on to produce any number of results. Such operations are often performed by workflows that include any number of services, each using any number of applications, modules, etc. It may be advantageous to deploy all or portions of such workflows within certain portions of the ecosystem of devices. However, as the complexity of such an ecosystem increases (e.g., more data, more devices, etc.), it may become difficult to determine where to deploy workflows, and how to efficiently do so once an execution environment is determined.

SUMMARY

In general, certain embodiments described herein relate to a method for deploying workflows. The method may include receiving, by a global orchestrator of a device ecosystem, a request to execute a workflow; decomposing, by the global orchestrator, the workflow into a plurality of workflow portions; executing, by the global orchestrator, a metaheuristic algorithm to generate a result comprising a plurality of domains of the device ecosystem in which to execute the plurality of workflow portions; and providing, by the global orchestrator, the plurality of workflow portions to respective local orchestrators of the plurality of domains based on the result of executing the metaheuristic algorithm.

In general, certain embodiments described herein relate to a non-transitory computer readable medium that includes computer readable program code, which when executed by a computer processor enables the computer processor to perform a method for deploying workflows. The method may include receiving, by a global orchestrator of a device ecosystem, a request to execute a workflow; decomposing, by the global orchestrator, the workflow into a plurality of workflow portions; executing, by the global orchestrator, a metaheuristic algorithm to generate a result comprising a plurality of domains of the device ecosystem in which to execute the plurality of workflow portions; and providing, by the global orchestrator, the plurality of workflow portions to respective local orchestrators of the plurality of domains based on the result of executing the metaheuristic algorithm.

In general, certain embodiments described herein relate to a system for deploying workflows. The system may include a global orchestrator for a device ecosystem, comprising a processor and memory, operatively connected to a plurality of local orchestrators, and configured to receive a request to execute a workflow; decompose the workflow into a plurality of workflow portions; execute a metaheuristic algorithm to generate a result comprising a plurality of domains of the device ecosystem in which to execute the plurality of workflow portions; and provide the plurality of workflow portions to respective local orchestrators of the plurality of domains based on the result of executing the metaheuristic algorithm.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
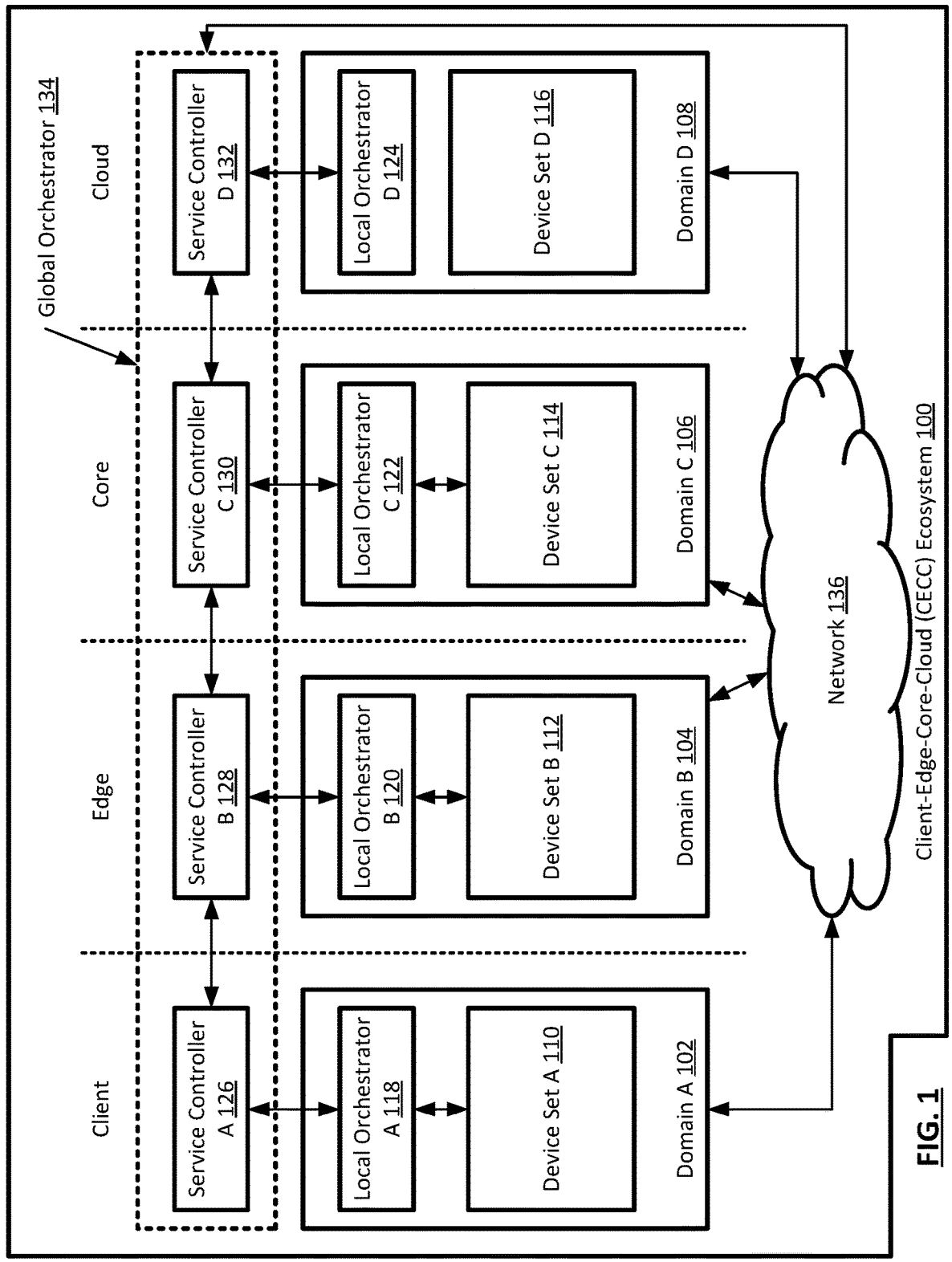
FIG. 1 shows a diagram of a system in accordance with one or more embodiments of the invention.

Specific embodiments will now be described with reference to the accompanying figures.

In the below description, numerous details are set forth as examples of embodiments described herein. It will be understood by those skilled in the art, that have the benefit of this Detailed Description, that one or more embodiments of the embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, embodiments described herein relate to methods, systems, and non-transitory computer readable mediums storing instructions for provisioning workflows, or portions thereof, in a device ecosystem using metaheuristic optimization techniques at a global ecosystem level and heuristic optimization techniques at a local domain level.

In one or more embodiments, as device ecosystems grow in size and complexity (e.g., from client to edge to core to cloud), connecting more diverse devices generating more data, the need to be able to inventory and characterize the connectivity is required in order to support complex workflows that may span any number of domains. In one or more embodiments, as the overall application workflow extends within a device ecosystem to capture, process, analyze, or otherwise use data, fitting the services of the application workflow to the capabilities of the various portions of the ecosystem is required. Such fitting may allow for meeting the service level objective (SLO) for the application workflow and the services used in building the workflow, which may be achieved by provisioning work to portions of the ecosystem having necessary capabilities, capacity, and/or data, using mapping relationships between devices. In one or more embodiments, the device ecosystem from client to edge to core to cloud can be mapped into a graph, database, etc., with elements discovered and relationships established and maintained for queries made to determine where one or more portions of a given workflow could possibly be deployed.

To achieve such goals, in one or more embodiments, a global orchestrator receives, from local orchestrators associated with respective device domains, capabilities and capacity information. Such capability and capacity information, along with information related to connectivity between different portions of the ecosystem, may be included, by the global orchestrator, in a graph or other data construct representing the device ecosystem.

In one or more embodiments, each local orchestrator in an ecosystem obtains and stores more detailed information of the device set of the domain with which it is associated, including, but not limited to, details related to topology, connection bandwidth, processors, memory, storage, data stored in storage, network configuration, domain accelerators (e.g., graphics processing units (GPUs)), deployed operating systems, programs and applications, etc. In one or more embodiments, the more detailed information kept by the various local orchestrators represents a different layer of the graph or database of the ecosystem. Thus, in one or more embodiments, the global orchestrator of an ecosystem has a map of the capabilities and capacity of the various portions of the ecosystem, while the underlying local orchestrators have a more detailed map of the actual resources within a given domain device set with which they are associated. In one or more embodiments, the global orchestrator optimizes deployment of workflows from a global perspective (e.g., using metaheuristic algorithms), and local orchestrators further optimize deployment of workflow portions provided to them by the global orchestrator (e.g., using heuristic techniques).

In one or more embodiments, a local orchestrator, associated with a domain of devices, determines the local topology in the domain, and collects and aggregates information about the devices in the domain. Such information may include, but is not limited to, compute resources, memory resources, accelerator resources, software resources, operating systems, network information, storage information, resource capacity information (e.g., based at least in part on on-going execution of various workloads), etc. In one or more embodiments, the local orchestrator maintains a machine learning algorithm, such as a classifier, to determine, based on the aforementioned local domain information, what capabilities the domain is suited to perform. In one or more embodiments, the capabilities for the domain, and its capacity, are communicated from the local orchestrator to the global orchestrator. In one or more embodiments, the global orchestrator receives such information from any number of local orchestrators associated with any number of domains in a device ecosystem.

In one or more embodiments, a global orchestrator may receive a request to execute a workflow (e.g., from a console accessing the global orchestrator). In one or more embodiments, the global orchestrator decomposes the workflow into workflow portions, such as services required, data needed, etc. In one or more embodiments, one or more such workflow portions (or sub-portions) may be identified as an anchor point (e.g., a specific data set required by the workflow). In one or more embodiments, the global orchestrator then queries the graph (e.g., by performing a depth first or breadth first search) or database (e.g., using database query techniques) representing the ecosystem to determine what portion of the ecosystem includes the one or more anchor points (e.g., where the necessary data is or is generated from, where the infrastructure exists to execute a given service, etc.).

In one or more embodiments, once the anchor point has been identified, the service controller may then map it to the appropriate ecosystem portion (e.g., the location of certain data), and prune the overall ecosystem graph to include only relevant branches and leaves of the ecosystem relative to the anchor point, thereby reducing the scope of the task of scheduling the workflow for execution in the ecosystem. In one or more embodiments, the graph of the ecosystem may be further pruned by querying the pruned graph to identify domains that have relevant capabilities and have capacity to execute workflow portions.

In one or more embodiments, using the pruned graph of the ecosystem, the global orchestrator then uses a metaheuristic algorithm (e.g., simulated annealing) to determine one or more domains in which workflow portions should be optimally executed. The metaheuristic algorithm may be configured to provide a result based at least in part on any type or combination of types of constraints, such as time, cost, cost and time, etc. The metaheuristic algorithm may account for various types of information when determining where to deploy workflow portions, such as capabilities of the domains, capacity of the domains, constraints and requirements received with the workflow execution request, policy constraints of the ecosystem, results of workflow trace analysis, identified critical paths of the workflow, etc.

In one or more embodiments, once the locations (e.g., domains) in which to execute the various workflow portions have been identified, the global orchestrator provides the workflow portions, along with other related information, constraints, requirements, critical path identification, etc. to the local orchestrators associated with the domains in which the workflow portions will be executed.

In one or more embodiments, each local orchestrator receives a workflow portion and related information, parses the workflow portion, and identifies devices to use for executing the workflow portion based on the topology, capabilities, capacity, resources, etc. of the devices in the domain. The local orchestrator may use a heuristic algorithm to determine how to compose a system of devices for executing the workflow portion. The local orchestrator may use such techniques to determine a first fit for the workflow portion (e.g., if the domain has not previously executed any similar workflow portion), determine a best fit for executing the workflow portion (e.g., based at least in part on previous workflow portion executions), determine that resources need to be reserved for the workflow execution (e.g., using ballooning type operations to reserve resources of devices in the domain), identify templates for composing device systems for executing all or any part of the workflow portion, etc.

In one or more embodiments, each time a workflow portion is executed, the details of the execution are captured by the local orchestrator, which may then communicate such details to the global orchestrator, during and/or after said execution. Details of the execution are conveyed, at least in part, in updated capabilities for the domain, an updated capacity report for the domain, etc. The global orchestrator may then use such information when provisioning future workflows, when determining if a SLO is being met for the workflow, for determining whether to move all or any portion of a workflow, etc.

FIG. 1 shows a diagram of a system in accordance with one or more embodiments described herein. The system may include client-edge-core-cloud (CECC) ecosystem (100). CECC ecosystem (100) may include domain A (102), domain B (104) domain C (106) and domain D (108). Domain A (102) may include local orchestrator A (118) and device set A (110). Domain B (104) may include local orchestrator B (120) and device set B (112). Domain C (106) may include local orchestrator C (122) and device set C (114). Domain D (108) may include local orchestrator D (124) and device set D (116). Domain A (102) may be operatively connected to (or include) service controller A (126). Domain B (104) may be operatively connected to (or include) service controller B (128). Domain C (106) may be operatively connected to (or include) service controller C (130). Domain D (108) may be operatively connected to (or include) service controller D (132). Service controller A (126), service controller B (128), service controller C (130), and service controller D (132) may collectively be global orchestrator (134). All or any portion of any device or set of devices in CECC ecosystem (100) may be operatively connected to any other device or set of devices via network (136). Each of these components is described below.

In one or more embodiments, CECC ecosystem (100) may be considered a hierarchy of ecosystem portions. In the example embodiment shown in FIG. 1, CECC ecosystem (100) includes a client portion, an edge portion, a core portion, and a cloud portion. However, CECC ecosystem (100) is not limited to the example arrangement shown in FIG. 1. CECC ecosystem (100) may have any number of client portions, each operatively connected to any number of edge portions, which may, in turn, be operatively connected to any number of core portions, which may, in turn, be connected to one or more cloud portions. Additionally, a given CECC ecosystem (100) may have more or less layers without departing from the scope of embodiments described herein. For example, the client portion may be operatively connected to the core portion, or the cloud portion, without an intervening edge portion. As another example, there may be a far edge portion and a near edge portion of ecosystem (100). One of ordinary skill in the art will recognize that there are many possible arrangements of CECC ecosystem (100) other than the example hierarchy shown in FIG. 1.

In one or more embodiments, domain A (100) is a portion of CECC ecosystem (100) in the client portion of CECC ecosystem (100). Similarly, domain B (104), domain C (106) and domain D (108) are in the edge portion, the core portion, and the cloud portion, respectively.

In one or more embodiments, domain A (102) includes device set A (110). In one or more embodiments, device set A (110) includes any number of computing devices (not shown). In one or more embodiments, a computing device is any device, portion of a device, or any set of devices capable of electronically processing instructions and may include any number of components, which include, but are not limited to, any of the following: one or more processors (e.g. components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown), accelerators (e.g., GPUs) (not shown), sensors for obtaining data, and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre/fiber channel storage device, an Internet Small Computer Systems Interface (iSCSI) storage device, a tape storage device, a flash storage array, a network attached storage device, etc.), a network device (e.g., switch, router, multi-layer switch, etc.), a hyperconverged infrastructure, a cluster, a virtual machine, a logical container (e.g., for one or more applications), a controller, a sensor, and/or any other type of device with the aforementioned requirements.

In one or more embodiments, any or all of the aforementioned examples may be combined to create a system of such devices. Other types of computing devices may be used without departing from the scope of the embodiments described herein.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums, which may store software and/or firmware.

Such software and/or firmware may include instructions which, when executed by the one or more processors (not shown) or other hardware (e.g., circuitry) of a computing device and/or system of computing devices, cause the one or more processors and/or other hardware components to perform operations in accordance with one or more embodiments described herein.

The software instructions may be in the form of computer readable program code to perform, when executed, methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments, such computing devices may be operatively connected to other computing devices of device set A (110) in any way, thereby creating any topology of computing devices within device set A (110). In one or more embodiments, one or more computing devices in device set A (110) may be operatively connected to any one or more devices in any other portion of CECC ecosystem (100). Such operative connections may be all or part of a network (136). A network (e.g., network (136)) may refer to an entire network or any portion thereof (e.g., a logical portion of the devices within a topology of devices). A network may include a data center network, a wide area network, a local area network, a wireless network, a cellular phone network, and/or any other suitable network that facilitates the exchange of information from one part of the network to another. A network may be located at a single physical location, or be distributed at any number of physical sites. In one or more embodiments, a network may be coupled with or overlap, at least in part, with the Internet.

In one or more embodiments, although shown separately in FIG. 1, network (136) may include any number of devices within any device set (e.g., 110, 112, 114, 116) of CECC ecosystem (100), as well as devices external to, or between, such portions of CECC ecosystem (100). In one or more embodiments, at least a portion of such devices are network devices (not shown). In one or more embodiments, a network device is a device that includes and/or is operatively connected to persistent storage (not shown), memory (e.g., random access memory (RAM)) (not shown), one or more processor(s) (e.g., integrated circuits) (not shown), and at least two physical network interfaces, which may provide connections (i.e., links) to other devices (e.g., computing devices, other network devices, etc.). In one or more embodiments, a network device also includes any number of additional components (not shown), such as, for example, network chips, field programmable gate arrays (FPGAs), application specific integrated circuits (ASICs), indicator lights (not shown), fans (not shown), etc. A network device may include any other components without departing from the scope of embodiments described herein. Examples of a network device include, but are not limited to, a network switch, a router, a multilayer switch, a fibre channel device, an InfiniBand® device, etc. A network device is not limited to the aforementioned specific examples.

In one or more embodiments, a network device includes functionality to receive network traffic data units (e.g., frames, packets, tunneling protocol frames, etc.) at any of the network interfaces (i.e., ports) of a network device and to process the network traffic data units. In one or more embodiments, processing a network traffic data unit includes, but is not limited to, a series of one or more lookups (e.g., longest prefix match (LPM) lookups, forwarding equivalence class (FEC) lookups, etc.) and corresponding actions (e.g., forward from a certain egress port, add a labeling protocol header, rewrite a destination address, encapsulate, etc.). Examples network traffic data unit processing include, but are not limited to, performing a lookup to determine: (i) whether to take a security action (e.g., drop the network traffic data unit); (ii) whether to mirror the network traffic data unit; and/or (iii) how to route/forward the network traffic data unit in order to transmit the network traffic data unit from an interface of the network device. In one or more embodiments, network devices are configured to participate in one or more network protocols, which may include discovery schemes by which a given network device may obtain information about all or any of the network topology in which the network device exists. Such discovery schemes may include sharing of information between network devices, and may also include providing information to other devices within CECC ecosystem (100), such as, for example, the global orchestrator and/or local orchestrators (discussed below).

In one or more embodiments, any or all of the devices in device set A (110) may form one or more virtualization environments (not shown). In one or more embodiments, a virtualization environment is any environment in which any number of computing devices are subject, at least in part, to a shared scheme pooling compute resources for use in deploying virtualized computing device instances (e.g., VMs, containers, emulators, etc.), which may be used in any arrangement to perform all or any portion of any work requested within a domain.

In one or more embodiments, domain A (102) also includes local orchestrator A (118). In one or more embodiments, local orchestrator A (118) is any computing device (described above), or any portion of any computing device. In one or more embodiments, local orchestrator A (118) executes as a service. In one or more embodiments, local orchestrator A (118) includes functionality to discover details of device set A (110). Such details include, but are not limited to: how devices are connected; what resources a device has (e.g., processors, memory, storage, networking, accelerators, etc.), how much capacity of a device or set of devices is used; what operating systems are executing on devices; how many virtual machines or other virtual computing instances exist; what data exists and where it is located; and/or any other information about devices in device set A (110).

In one or more embodiments, based on the information discovered by local orchestrator A (118) about device set A (110), local orchestrator A determines what capabilities device set A (110), or any portion thereof, may perform. In one or more embodiments, a capability is any one or more actions, operations, functionality, stored data, ability to obtain data from any number of data sources, compute resources to perform certain tasks, etc. Examples of capabilities include, but are not limited to, inference, training for machine learning, implementing in-memory databases, having a particular dataset (e.g., video and images from stores of a certain company in a certain region of the country), performing classification, data analysis, etc. Embodiments described herein are not limited to the aforementioned examples. In one or more embodiments, local orchestrator A (118) uses one or more machine learning algorithms (e.g., a classifier) in order to determine the capabilities that a domain has based on the information discovered about devices in the domain. In one or more embodiments, local orchestrator B (120), local orchestrator C (122), and local orchestrator D (124) are also computing devices (described above), and perform functionality similar to that of local orchestrator A (118) for their respective domains (i.e., domain B (104), domain C (106), and domain D (108)).

In one or more embodiments, each domain (e.g., 102, 104, 106, 108) in CECC ecosystem (100) includes a device set (e.g., 110, 112, 114, 116) and a local orchestrator (e.g., 118, 120, 122, 124). In one or more embodiments, each device set is a set of computing devices, such as is discussed above in the description of device set A. However, the set of computing devices in different device sets may be different, and may be particular to the portion (e.g., client, edge, cloud, core) of CECC ecosystem (100) that the device set is in. For example, the client portion of CECC ecosystem (100) may include sensors collecting data, controllers controlling the sensors, desktop devices, mobile computing devices, etc. Other data sets may include different computing devices. For example, the edge portion of CECC ecosystem (100) may have a device set that includes servers with more compute ability than devices in the client portion. Similarly, the core portion of CECC ecosystem (100) may include more powerful devices, a greater quantity of more powerful devices, specific architectures of sets of devices for performing certain tasks, etc. Also similarly, the cloud portion of CECC ecosystem (100) may include still more and different devices configured and deployed in different ways that the other portions of CECC ecosystem (100).

Additionally, although not shown in FIG. 1, CECC ecosystem (100) may be arranged in a hierarchy. For example, a single cloud portion may be operatively connected to any number of core portions, each of which may be connected to any number of edge portions, each of which may be connected to any number of client portions. The particular device set (110, 112, 114, 116) in any given portion of CECC ecosystem (100) may determine what capabilities the domain (102, 104, 106, 108) in which the device set exists is suited to perform, which is known to and/or determined by the local orchestrator for the domain (102, 104, 106, 108).

In one or more embodiments, each local orchestrator (118, 120, 122, 124) is operatively connected to a respective service controller (126, 128, 130, 132). Any portion of CECC ecosystem (100) may include any number of service controllers (126, 128, 130, 132), each of which may be operatively connected to any number of local orchestrators (118, 120, 122, 124) in any number of domains (102, 104, 106, 108) in a given ecosystem portion (e.g., client, edge, core, cloud). In one or more embodiments, each service controller (126, 128, 130, 132) is also operatively connected to the other service controllers (126, 128, 130, 132) in CECC ecosystem (100). In one or more embodiments, the operatively connected service controllers (126, 128, 130, 132) of CECC ecosystem (100) form global orchestrator (134) for CECC ecosystem (100). Although FIG. 1 shows global orchestrator (134) as a collection of services controllers, the global orchestrator may instead be a single device, or any quantity of devices, without departing from the scope of embodiments described herein.

In one or more embodiments, global orchestrator (134) functions as a distributed service for deploying workflows within CECC ecosystem (100). In one or more embodiments, any service controller (126, 128, 130, 132) of global orchestrator (134) may be accessed to request provisioning of a workflow. In one or more embodiments, each service controller (126, 128, 130, 132) receives, from operatively connected local orchestrators within the same portion of CECC (100), information about what capabilities underlying device sets of a domain can perform, how much capacity is available on the device set within a given domain (which may be updated on any update schedule), and/or any other information or metadata that may be useful to determine whether a portion of a workflow should be or can be provisioned within a given domain.

In one or more embodiments, each service controller of global orchestrator (134) also shares the information with each other service controller of global orchestrator (134). Collectively, the shared information may be organized as a graph, or database, or any other data construct capable of storing such information, and of being queried to find such information. Such a graph or database may be a distributed data construct shared between the collection of service controllers of global orchestrator (134).

While FIG. 1 shows a configuration of components, other configurations may be used without departing from the scope of embodiments described herein. Accordingly, embodiments disclosed herein should not be limited to the configuration of components shown in FIG. 1.

Figure 2A:
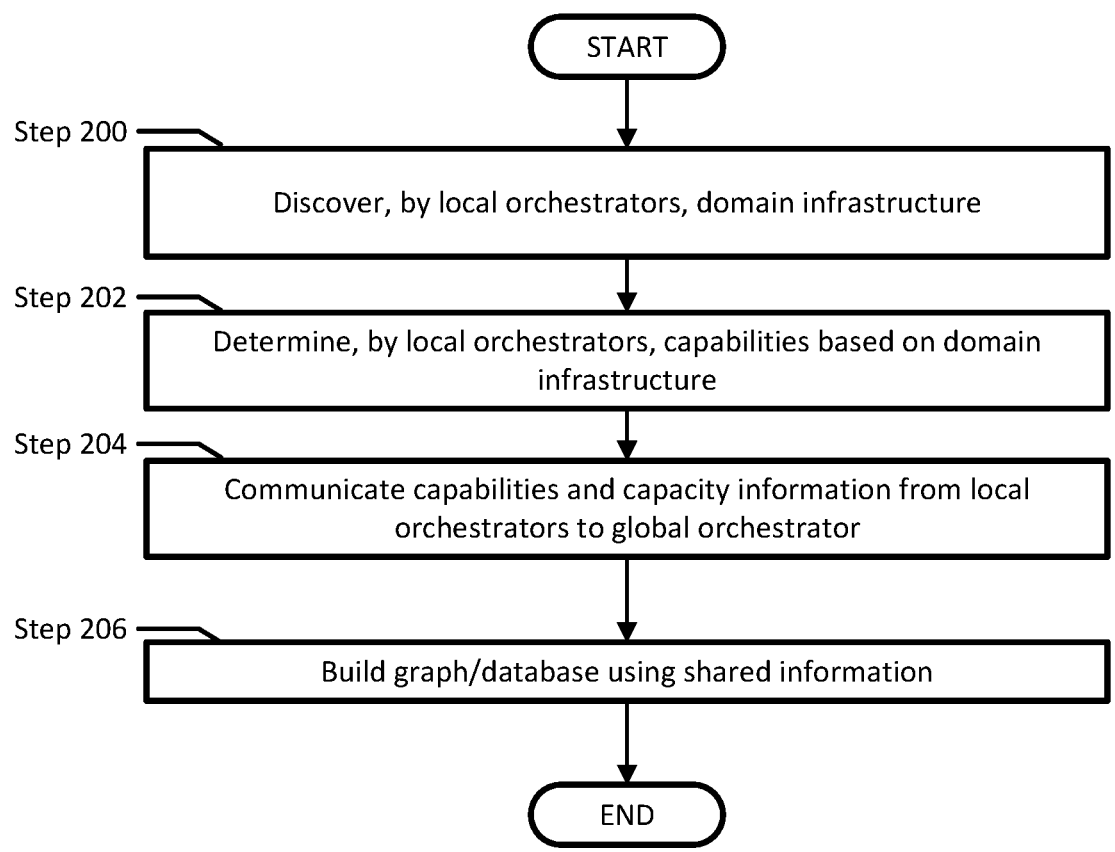
FIG. 2A shows a flowchart in accordance with one or more embodiments of the invention.

FIG. 2A shows a flowchart describing a method for discovering and obtaining information about an ecosystem of devices to be stored in a data construct for future queries when provisioning workflows in accordance with one or more embodiments disclosed herein.

While the various steps in the flowchart shown in FIG. 2A are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 200, each local orchestrator in a given ecosystem discovers information about the device set in the domain in which the local orchestrator exists and/or with which the local orchestrator is associated. Such information may include, but is not limited to, the topology of the devices, the computing resources of the devices, configuration details of the devices, operating systems executing on the devices, the existence of any number of virtualized computing device instances, where any number of datasets are stored, how much of the capacity of any one or more devices is being used and/or has available, etc.

In one or more embodiments, any mechanism and/or scheme for discovering such information may be used, and any number of different mechanisms and/or schemes may be used to obtain various types of information. For example, the local orchestrator may request virtualization infrastructure information from one or more virtualization controllers, determine domain network topology by participating in and/or receiving information shared among domain network devices pursuant to one or more routing protocols, perform queries to determine quantity and type of processors, amount of memory, quantity of GPUs, amount of storage, number of network ports, etc. for servers, determine what type of information is being collected and/or processed by various sensors, controllers, etc., determine where datasets of a particular type or purpose are stored by communicating with one or more storage controllers, etc. Any other form of discovery may be performed by the local orchestrators without departing from the scope of embodiments described herein.

In Step 202, based on the information discovered in Step 200, a given local orchestrator determines what capabilities the device set of a domain has. In one or more embodiments, determination of the capabilities of the device set, or any portion thereof, may be performed in any manner capable of producing one or more capabilities that a given device set, connected and configured in a particular way, may perform. For example, the local orchestrator may execute a machine learning algorithm that has been trained to identify certain capabilities of a domain set based on the set of information about a given device set of a domain.

In Step 204, the capabilities of the domain determined in Step 202 are communicated from the local orchestrator to a global orchestrator, along with information about the currently available capacity of the domain. Such capability and capacity information may be updated and provided to the global orchestrator on any recurring schedule. For example, a local orchestrator may communicate to a global orchestrator that the domain has the capability to perform inference, to analyze data in a particular way, to train certain types of machine learning algorithms, has the sensors to obtain certain types of data, etc. At the same time, the local orchestrator may also communicate, for example, that currently 27% of the resources of the domain, or any portion therein, is available to perform additional work. In one or more embodiments, the local orchestrator may also communicate any other information about the domain to the service controller, such as that the domain has (or has sensors to obtain) particular datasets that may be used for particular purpose (e.g., training a certain type of machine learning algorithm).

In embodiments in which the global orchestrator includes a number of service controllers, each of the service controllers of an ecosystem share the capabilities, capacity, and other information with each other. Sharing information may include sending some or all of the information to the other service controllers, and/or storing the information in a location that is commonly accessible by the service controllers. In one or more embodiments, the service controllers also share information about how the different portions of the ecosystem are operatively connected. For example, the service controllers may use information gained from devices executing a border gateway protocol (BGP) to obtain topology information for the ecosystem.

In Step 206, the global orchestrator of the ecosystem builds a graph or database using the information communicated from the local orchestrators in Step 204. In one or more embodiments, the graph or database is stored as a distributed data construct by the service controllers of the global orchestrator, and may be distributed in any way that a set of information may be divided, so long as it is collectively accessible by each of the service controllers of the global orchestrator. In one or more embodiments, the graph or database is stored in a form which may be queried to find information therein when determining how to provision portions of a workflow for which execution is requested. Receiving a request to execute a workflow, querying the graph or database, and provisioning the workflow portions to various domains in the various portions of the ecosystem is discussed further in the description of FIG. 2B, below.

Figure 2B:
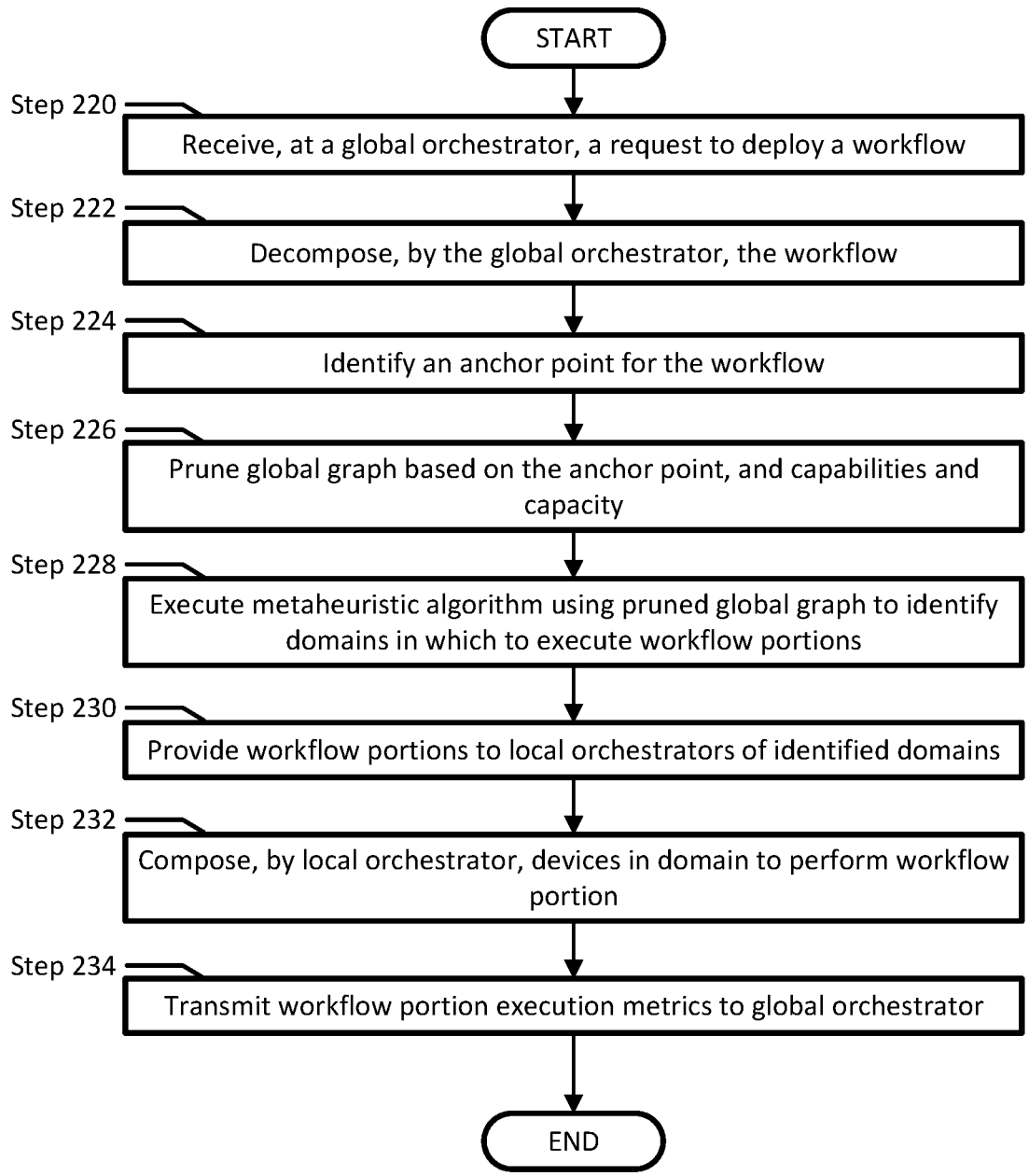
FIG. 2B shows a flowchart in accordance with one or more embodiments of the invention.

FIG. 2B shows a flowchart describing a method for provisioning workflows within a device ecosystem in accordance with one or more embodiments disclosed herein.

While the various steps in the flowchart shown in FIG. 2B are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 220, a request to deploy a workflow is received at a global orchestrator controller of a device ecosystem. In one or more embodiments, the request is received in any form that conveys, at least, requirements and constraints for performing the workflow. Constraints may be based, at least in part, on an SLO associated with the workflow between the entity requesting execution of the workflow and the entity providing the ecosystem in which the workflow will be deployed. Requirements may include that the workflow will require certain amounts or types of compute resources of an ecosystem of devices, require certain data be available and/or obtained, require that certain technologies for data transfer be used (e.g., low latency network solutions), etc. In one or more embodiments, the request is received in a form. For example, the request may be received in the form of a YAML file that is a manifest of the interconnected services of a workflow. The request may be received at a global orchestrator through any form of communicating with a computing device. For example, a user may be provided with access to a cloud console that is configured to access a global orchestrator of a device ecosystem.

In Step 222, the global orchestrator decomposes the workflow. In one or more embodiments, decomposing the workflow includes identifying various workflow portions, such as services to be executed, data to be used and/or obtained, etc. In one or more embodiments, decomposing a workflow includes expressing the workflow as a DAG. A given workflow may include any number of workflow portions. As an example, a workflow may be a single service. As another example, a workflow may be any number of services that are in an ordered relationship with any number of interrelated dependencies between them. In one or more embodiments, decomposing the workflow includes performing a trace analysis. In one or more embodiments, a trace analysis is a trace of the workflow as it will be executed in the different domains associated with respective local orchestrators. A trace analysis may include information related to order of services and operations performed, data generation, data movement, data consumption, etc. A trace analysis may include determining the flow of work within domains and/or between domains. In one or more embodiments, a trace analysis yields one or more critical path portions of the workflow. As an example, a critical path may be the longest execution path within the workflow, from a time perspective, a distance perspective, etc. In one or more embodiments, a critical path is associated with a constraint of the workflow. As an example, a workflow may be related to a self-driving vehicle, and a critical path in such a workflow is the time taken to determine what action to take in relation to vehicle movement (e.g., stop the car to avoid hitting an object or person). Such a path may be more critical, as an example, than a workflow path that yields a favorite radio station list to present to a driver via an infotainment system, and may have a time threshold within which the execution required to produce a result must happen.

In Step 224, the global orchestrator identifies an anchor point for the workflow. In one or more embodiments, decomposing a workflow includes identifying one or more anchor points of the workflow. In one or more embodiments, an anchor point is any workflow portion or sub-portion that can be identified as requiring a specific placement within the device ecosystem in which the workflow is to be deployed. As an example, an anchor point may be a particular dataset that is needed (e.g., for training a machine learning algorithm) that is stored in a certain storage location within the ecosystem. As another example, an anchor point may be a particular capability (e.g., inference, certain data analytics, etc.) that a workflow portion requires that may only be performed by domain device sets having particular characteristics. As another example, an anchor point may be the need for data acquired in a specific geographic region. Workflow portions other than the aforementioned examples may be identified as being or including an anchor point without departing from the scope of embodiments described herein.

In Step 226, the global orchestrator prunes the global graph representing the ecosystem (e.g., generated in Step 206 of FIG. 2A) based in the anchor point(s) identified in Step 224. In one or more embodiments, pruning the graph includes eliminating branches and leaves of the graph representation of the ecosystem to eliminate branches that are not relevant with respect to the anchor point. As an example, if the anchor point is a certain dataset stored in storage at a specific physical site, then pruning the graph may include eliminating portions of the graph representing portions of the ecosystem that are located at geographic locations beyond a defined distance threshold in order to minimize the network and/or monetary cost of data transfer while executing the workflow. In one or more embodiments, pruning the graph also includes removing branches and leaves of the graph based on capabilities and/or capacity expressed to the global controller by domains represented by said branches and leaves that are not relevant or currently useful for executing the workflow. As an example, portions of the graph representing domains that only expressed having capabilities that are not needed to execute the workflow may be pruned. As another example, portions of the graph representing domains that have expressed having no capacity to execute additional work, or less capacity than is needed by the workflow, may be pruned.

In Step 228, the global orchestrator executes a metaheuristic algorithm using the pruned global graph to identify local orchestrators associated with domains in which the various workflow portions identified in Step 222 will be executed. Any metaheuristic algorithm, or combination of two or more metaheuristic algorithms may be used by the global orchestrator without departing from the scope of embodiments described herein. Examples of such metaheuristic algorithms include, but are not limited to: simulated annealing; genetic algorithm; particle swarm; Bayesian optimization, etc. In one or more embodiments, the global orchestrator provides bounds for the metaheuristic algorithm in order to provide a most optimal solution given the bounds, such as, for example, time to optimal solution, cost of solution, resources available for solution, any combination thereof, or any other one or more constraints. In one or more embodiments, execution a metaheuristic algorithm may not result in the absolute best optimization, but instead the best optimization within the constraining parameters. The metaheuristic algorithm used by the global orchestrator may use any number of input factors to determine an optimal solution for where, within a device ecosystem, to deploy workflow portions of a workflow. Such factors include, but are not limited to, capabilities of the various domains, capacity of the various domains, compute resources available in the domains, constraints and requirements associated with the workflow, constraints and requirements implemented for the device ecosystem, the results of the trace analysis performed in Step 222, any critical paths identified for the workflow, etc. Other factors may be used for the metaheuristic algorithm execution without departing from the scope of embodiments described herein. In one or more embodiments, the execution of the one or more metaheuristic algorithms results in an identification of one or more local orchestrators associated with the one or more domains in which one or more portions of the workflow are to be executed.

In Step 230, the global orchestrator provides the workflow portions and related constraints (e.g., constraints derived from the SLO corresponding to the workflow, identified critical paths of the workflow, etc.) to the local orchestrators identified in Step 224. In one or more embodiments, the workflow portion and any corresponding constraints are provided to the local orchestrators using any appropriate method of data transmission. As an example, the global orchestrator may communicate the workflow portion details, corresponding constraints, and any other relevant information as network data traffic units over a series of network devices that operatively connect the global orchestrator and the relevant local orchestrator.

In Step 232, a local orchestrator that received a workflow portion in Step 230 composes a system of devices from among the device set of the domain with which the local orchestrator is associated, and initiates execution of the workflow portion. In one or more embodiments, in order to compose the aforementioned system, the local orchestrator parses the workflow portion, related constraints, and other information, and uses any technique for finding appropriate device resources on which to execute the workflow portion. In one or more embodiments, the local orchestrator uses a heuristic algorithm of any type to identify devices on which to perform the workflow portion when a similar workflow portion has not previously been performed in the domain, which may be referred to as a first fit for the workflow portion. In one or more embodiments, if a similar workflow portion has been executed in the domain previously, the local orchestrator may use any information learned during the one or more previous executions to identify and compose resources on which to execute the workflow portion. In one or more embodiments, the local orchestrator performs reservation actions, where appropriate, for the workflow portion. For example, the local orchestrator may determine, based on the information provided by the global orchestrator, that the workflow portion includes at least part of a critical path portion of the workflow, and that it must be completed within a given time constraint. Therefore, in such a scenario, the local orchestrator may perform actions like resource ballooning to capture and reserve resources for use in executing the workflow portion, to ensure that said resources are not used for performing other tasks. In one or more embodiments, the local orchestrator has access to a set of templates for performing workflow portions, and, if the workflow portion to be performed matches any of the templates, composes a system based on one or more of the templates.

In Step 234, workflow portion execution metrics and information are transmitted back to the global orchestrator during and/or after execution of the workflow portion. In one or more embodiments, such metrics and information contribute to the capacity information for the domain, which the global orchestrator may use for future workflow deployments.

Figure 3:
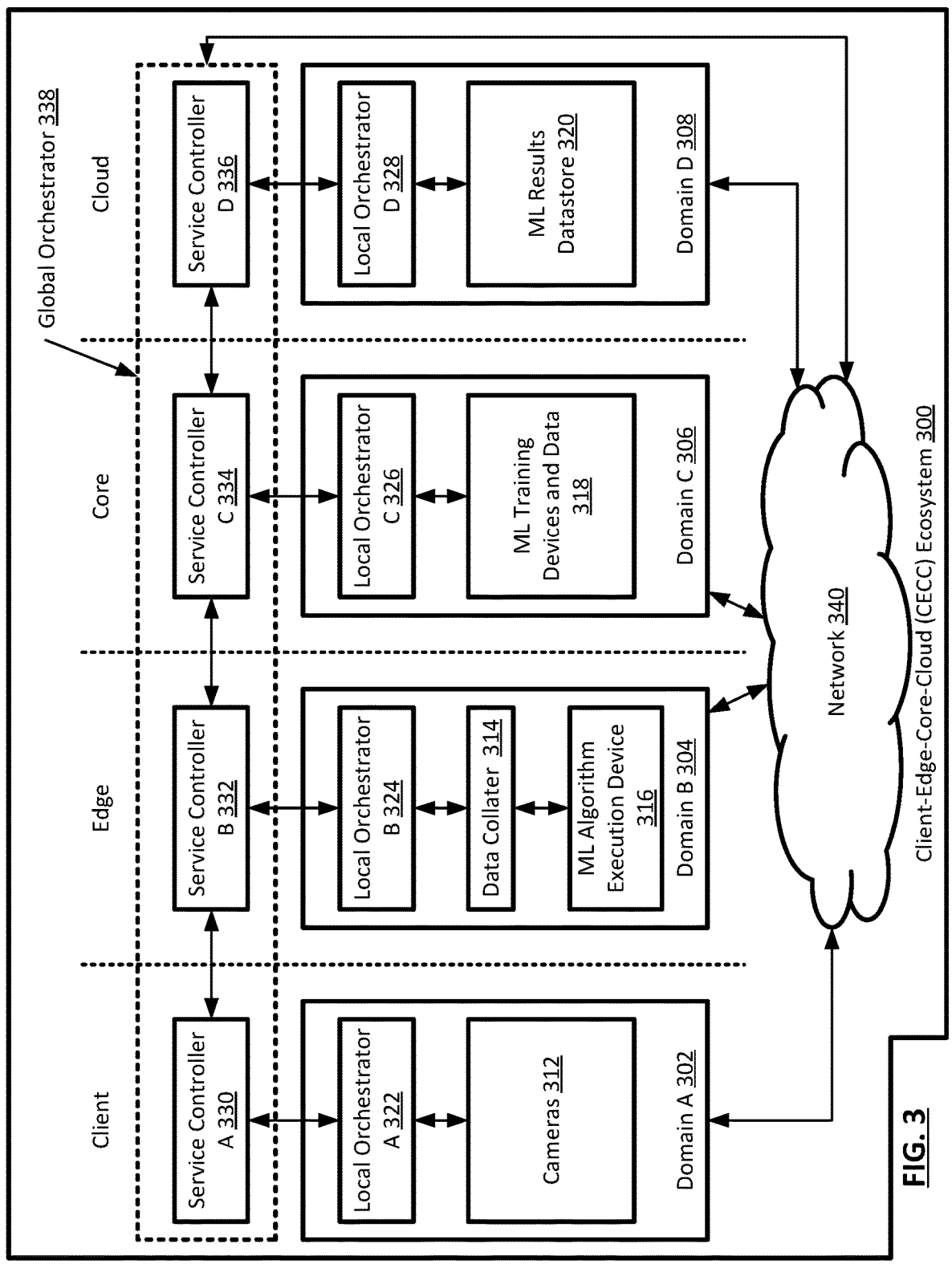
FIG. 3 shows an example in accordance with one or more embodiments of the invention.

FIG. 3 shows an example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in this particular example. This example is intended to be a simple example to illustrate, at least in part, concepts described herein. One of ordinary skill will appreciate that a real-world use of embodiments described herein may be a device ecosystem organized and interconnected in any manner, and that any number of different workflows to achieve any number of different results may be deployed in such an ecosystem of devices.

Referring to FIG. 3, consider a scenario in which a retail store has cameras deployed in the store on mobile robots to monitor inventory levels of items to be sold in the store. Based on the images, the store wants to have orders placed when inventory of the monitored items drops to a certain level, and wants to use the image data obtained by the robots to trigger the orders. To achieve this goal, the store needs a machine learning algorithm that has been trained to recognize when images of the inventory indicate that the inventory has reached the point of triggering the orders, and that has the ability to execute the trained algorithm using the images obtained by the cameras on the robots.

In such a scenario, the store will utilize CECC ecosystem (300), which includes many domains, including domain A (302) in a client portion of the ecosystem, domain B (304) in an edge portion of the ecosystem, domain C (306) in a core portion of the ecosystem, and domain D (308) in a cloud portion of the ecosystem. Domain A (302) includes local orchestrator A (322) and cameras (312). Domain B (304) includes local orchestrator B (324), data collater (314), and machine learning (ML) algorithm execution device (316). Domain C (306) includes local orchestrator C (326) and ML training devices and data (318). Domain D (308) includes local orchestrator D (328) and ML results data store (320). Domain A (302) is operatively connected to service controller A (330). Domain B (304) is operatively connected to service controller B (332). Domain C (306) is operatively connected to service controller C (334). Domain D (308) is operatively connected to service controller D (336). Service controller A (330), service controller B (332), service controller C (334), and service controller D (336) collectively are global orchestrator (338). All or any portion of any device or set of devices in CECC ecosystem (300) may be operatively connected to any other device or set of devices via network (340).

The client portion of the ecosystem exists in the store as cameras (312) on the robots, and the associated computing devices for capturing the inventory images. The edge portion of the ecosystem also exists at the store, and includes computing devices for collating the data (i.e., data collater (314)) and computing devices for executing the trained ML algorithm (i.e., ML algorithm execution device (316)). The store is part of a national chain that has a number of data centers across the country that collectively make up the core portion of the store chain's device ecosystem. Domain C (306) is in a data center of the core portion that is located in the same region as the store. The cloud portion of the ecosystem is used for storing information relevant to the chain of stores, and for historical purposes, as well as being the location from which all orders for the store chain are made.

When the store seeks to implement the new inventory management scheme, it submits the workflow as a YAML file to service controller A (330), which is implemented on a server located at the store and accessed via a console from a computer of the store manager. Service controller A (330) converts the YAML file into a DAG. In the DAG, the image data must be obtained from the cameras (312) at the store, the ML algorithm must be trained using image data the store owns. The trained ML algorithm must be provided to the ML algorithm execution device (316) located in the edge portion of the ecosystem that is also at the store. The image data from the cameras (312) must be collated and provided to ML algorithm execution device (316). Finally, the results of executing the ML algorithm based on the image data must be stored in the cloud so that the required items may be ordered. The aforementioned progression of the workflow is the result of a trace analysis of the workflow based on the DAG. The workflow was also provided with a constraint that orders for certain inventory items that are identified as needing re-ordering must happen within fifteen minutes of the timestamp on an image showing low inventory. Therefore, using the constraint, combined with the trace analysis, the global orchestrator (338) determines that the longest path in the workflow is a critical path, and must be executed in fifteen minutes or less.

The global orchestrator (338) decomposes the DAG, and identifies the image acquisition from the cameras in the store as the anchor point. Service controller A then performs a search of a previously constructed graph of capabilities and capacity of the various domains in the ecosystem, and identifies domain A (302) as including the relevant cameras (312). Domain A (302) and the cameras (312) therein this become the anchor point for the workflow.

The global orchestrator (338) then prunes the ecosystem global graph to include only domains that have expressed the ability to perform the aforementioned required capabilities for the workflow, that have the capacity to perform the work, and that are relatively close in distance to the location of the anchor point.

Next, the global orchestrator (338) uses a simulated annealing algorithm to identify local orchestrators associated with domains represented in the pruned global graph that can perform the various workflow portions. The simulated annealing algorithm takes into account the critical path related to the time constraint for the inventory ordering, the various capabilities and capacities of the domains in the pruned graph, policy constraints set by an ecosystem administrator, and other factors to identify the local orchestrators. The set of local orchestrators identified by the global orchestrator by using the simulated annealing algorithm are an optimized set of local orchestrators, and the result is produced within a time constraint that serves as a bound on the simulated annealing algorithm. However, it may not be an absolute optimum set, as in this scenario it was more important to get a result from the algorithm within a certain amount of time than it was to get the absolute best solution.

Based on the execution of the simulated annealing algorithm, the global orchestrator (338) assigns the data collation and ML algorithm execution portions of the workflow to local orchestrator B (324). The global orchestrator (338) also determines that local orchestrator C (326) has expressed by way of service controller C (334) that domain C (306) has image data for training the relevant ML algorithm, and the computing resources to perform the training. The global orchestrator then determines, by way of service controller D (336), that domain D (308) has the capability of storing ML algorithm execution results, and making orders of items needed for store inventories.

Based on the above results gained from executing the simulated annealing algorithm, the global orchestrator (338) provides the various workflow portions to the appropriate local orchestrators to perform the workflow portions.

Once assigned, local orchestrator A (322) deploys the data acquisition portion of the workflow on the cameras (312) of the robots in the store. Local orchestrator B (324) determines that it has previously performed image data collation using a particular set of devices in domain B (304), and that the service was performed successfully. Accordingly, local orchestrator B (324) provisions data collater (314) to perform the service. Local orchestrator B (324) also determines that obtaining and collating the data from the cameras, and providing the data to the ML algorithm execution device (316) is part of the critical path for the workflow. Accordingly, local orchestrator B (324) reserves network bandwidth and compute and memory resources for use by the data collater to prevent resource contention during execution of the workflow portion.

Local orchestrator B (324) also determines that execution of a similar ML algorithm has previous been performed successfully in domain B (304). However, the resources used to perform the previous workflow portion are not available. Therefore, local orchestrator B provisions a similar set of devices in a similar way (e.g., as a best fit) to perform the same tasks, as ML algorithm execution device (316).

Local orchestrator C (326) determines that domain C (306) has previously performed ML training on an image training data set, using a set of devices that currently have capacity to perform additional work. Accordingly, local orchestrator C (326) provisions the set of devices to perform this new workflow portion of ML training and connects the devices to the appropriate training data set to use during the training. The devices and data are shown collectively in FIG. 3 as ML training devices and data (318).

Local orchestrator D (328) determines that domain D (308) includes the appropriate data store for storing ML results (i.e., ML results data store (320)), and the capability to make orders based on results stored therein. Accordingly, local orchestrator D (328) provisions storage within data store (320) to store the results of the execution of the ML algorithm.

As the various workflow portions get deployed in the appropriate locations in the ecosystem, execution begins. First, the ML algorithm is trained using the store chains existing labeled image data in ML training devices and data (318) of domain C (306). Once the algorithm is sufficiently trained, the trained algorithm is provided over network (340) to ML algorithm execution device (316) of domain B (304). At that point, cameras (312) in domain A (302) begin capturing images of the inventory in the store room as the robots move up and down the aisles. The images are transmitted to data collater (314), which collates the images and provides them to ML algorithm execution device (316). ML algorithm execution device (316) then executes the ML algorithm using the images to determine if items need to be ordered. The results are then sent to the ML results data store (320) of domain D (308). An ordering module (not shown) also in domain D (308) accesses the results, and places the necessary orders.

Embodiments described herein relate to optimizing global resources connecting global to local domains through capabilities and relationships. With this the global orchestrator may ingest a workflow, with constraints and attributes, parse to a set of workflow portions, determine an optimal placement of services and requirements for the workflow portions, map the workflow portions to the local domains for execution, and connect the workflow portions for a seamless data plane. In one or more embodiments, this operation is instrumented and initiated at a global level using a meta-heuristic algorithm (e.g., simulated annealing) to find a set of local domains capable of performing some or all of the workflow portions. In one or more embodiments, the global orchestrator does not need to understand all of the underlying physical infrastructure, but instead is aware of the capabilities and capacity of the various ecosystem domains for performing work. In one or more embodiments, the number of possible optimization paths in a global graph can grow exponentially. In one or more embodiments, to meet a reasonable execution time the metaheuristic optimization algorithm can be limited in scope, constraints, parameters, features, and/or execution time. In one or more embodiments, controlling such factors provides a best fit for the global overlay without exposing any of the detailed underlay. In addition, in one or more embodiments, the local domain can maintain its detailed information and incorporate emerging technology, exposing only capabilities and capacity to the global orchestrator.

In one or more embodiments, by expressing capabilities to the global orchestrator, the local orchestrator maintains the capability to resource mapping, optimizing placement and service delivery locally without making the global orchestrator aware of such details. In one or more embodiments, this allows for the local domain to employ a heuristic algorithm locally, changing as needed to deliver the local optimizations and striving for optimal local operation. In one or more embodiments, as the global ecosystem can grow quite large, it cannot employ similar algorithms as are employed with respect to the local domain. Instead, in one or more embodiments, the local orchestrator of a domain leverages algorithms that may account for all resource combinations and start with 'greedy' resource utilization for workflow portion placement. In one or more embodiments, connecting local telemetry to resource use, and correlating to local workflow portion execution, the local orchestrator may create new optimal layouts, incorporating emerging technology to delivery capabilities without reflecting the details at a global level. In one or more embodiments, creating such a local-global abstraction allows for scaling optimization across a much larger ecosystem and meeting specific, demanding constraints at scale.

Figure 4:
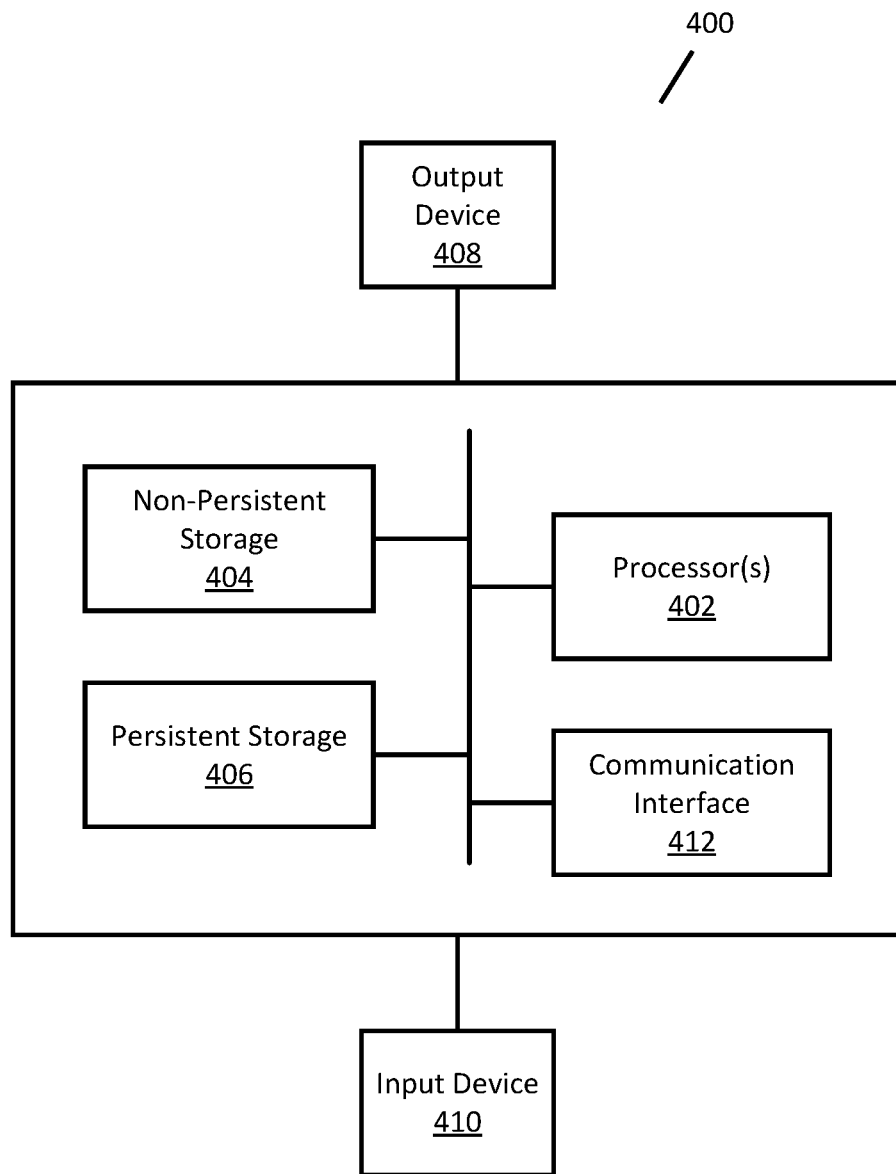
FIG. 4 shows a computing system in accordance with one or more embodiments of the invention.

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disc (CD) drive or digital versatile disc (DVD) drive, a flash memory, etc.), a communication interface (412) (e.g., Bluetooth® interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

The problems discussed above should be understood as being examples of problems solved by embodiments of the invention and the invention should not be limited to solving the same/similar problems. The disclosed invention is broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for deploying workflows, the method comprising:
   receiving, by a global orchestrator of a device ecosystem, a request to execute a workflow;
   decomposing, by the global orchestrator of the device ecosystem, the workflow into a plurality of workflow portions;
   executing, by the global orchestrator of the device ecosystem, a metaheuristic algorithm to generate a result comprising a plurality of domains of the device ecosystem in which to execute the plurality of workflow portions;
   providing, by the global orchestrator of the device ecosystem, the plurality of workflow portions to respective local orchestrators of the plurality of domains based on the result of executing the metaheuristic algorithm, wherein a workflow portion of the plurality of workflow portions is provided to a local orchestrator of a domain of the plurality of domains along with additional workflow portion requirements; and
   composing, by the local orchestrator of the domain of the plurality of domains, a plurality of devices in the domain of the plurality of domains for performing the workflow portion of the plurality of workflow portions, wherein the composing comprises performing a local optimization based on the additional workflow portion requirements.

2. The method of claim 1, wherein decomposing the workflow comprises performing a trace analysis based on the workflow.

3. The method of claim 2, wherein results of the trace analysis comprise a critical path associated with the workflow.

4. The method of claim 1, wherein the local optimization comprises reserving resources of the domain of the plurality of domains for execution of the workflow portion of the plurality of workflow portions.

5. The method of claim 1, wherein the local optimization comprises using a best fit composition based on a prior workflow portion execution.

6. The method of claim 1, further comprising:
   transmitting, by the local orchestrator of the domain of the plurality of domains and to the global orchestrator of the device ecosystem, workflow portion execution metrics associated with execution of the workflow portion of the plurality of workflow portions.

7. The method of claim 1, wherein decomposing the workflow comprises identifying an anchor point for the workflow.

8. The method of claim 7, further comprising, before executing the metaheuristic algorithm:
   pruning a global graph representing the device ecosystem based on the anchor point for the workflow to obtain a pruned global graph,
   wherein the metaheuristic algorithm is executed using the pruned global graph.

9. The method of claim 1, wherein the metaheuristic algorithm is constrained by one parameter selected from a group of parameters consisting of time and cost.

10. A non-transitory computer readable medium comprising computer readable program code, which when executed by a computer processor enables the computer processor to perform a method for deploying workflows, the method comprising:
    receiving, by a global orchestrator of a device ecosystem, a request to execute a workflow;
    decomposing, by the global orchestrator of the device ecosystem, the workflow into a plurality of workflow portions;
    executing, by the global orchestrator of the device ecosystem, a metaheuristic algorithm to generate a result comprising a plurality of domains of the device ecosystem in which to execute the plurality of workflow portions;
    providing, by the global orchestrator of the device ecosystem, the plurality of workflow portions to respective local orchestrators of the plurality of domains based on the result of executing the metaheuristic algorithm, wherein a workflow portion of the plurality of workflow portions is provided to a local orchestrator of a domain of the plurality of domains along with additional workflow portion requirements; and
    composing, by the local orchestrator of the domain of the plurality of domains, a plurality of devices in the domain of the plurality of domains for performing the workflow portion of the plurality of workflow portions, wherein the composing comprises performing a local optimization based on the additional workflow portion requirements.

11. The non-transitory computer readable medium of claim 10, wherein decomposing the workflow comprises performing a trace analysis based on the workflow.

12. The non-transitory computer readable medium of claim 11, wherein results of the trace analysis comprise a critical path associated with the workflow.

13. The non-transitory computer readable medium of claim 10, wherein the local optimization comprises reserving resources of the domain of the plurality of domains for execution of the workflow portion of the plurality of workflow portions.

14. The non-transitory computer readable medium of claim 10, wherein the local optimization comprises using a best fit composition based on a prior workflow portion execution.

15. The non-transitory computer readable medium of claim 10, wherein the method performed by executing the computer readable program code further comprises:
    transmitting, by the local orchestrator of the domain of the plurality of domains and to the global orchestrator of the device ecosystem, workflow portion execution metrics associated with execution of the workflow portion of the plurality of workflow portions.

16. The non-transitory computer readable medium of claim 10, wherein decomposing the workflow comprises identifying an anchor point for the workflow.

17. The non-transitory computer readable medium of claim 16, wherein the method performed by executing the computer readable program code further comprises, before executing the metaheuristic algorithm:
  pruning a global graph representing the device ecosystem based on the anchor point for the workflow to obtain a pruned global graph,
  wherein the metaheuristic algorithm is executed using the pruned global graph.

18. A system for deploying workflows, the system comprising:
  a global orchestrator for a device ecosystem, the global orchestrator comprising a processor and memory, wherein the global orchestrator is operatively connected to a plurality of local orchestrators, and configured to: receive a request to execute a workflow;
    decompose the workflow into a plurality of workflow portions;
    execute a metaheuristic algorithm to generate a result comprising a plurality of domains of the device ecosystem in which to execute the plurality of workflow portions;
    provide the plurality of workflow portions to respective local orchestrators of the plurality of domains based on the result of executing the metaheuristic algorithm, wherein a workflow portion of the plurality of workflow portions is provided to a local orchestrator of a domain of the plurality of domains along with additional workflow portion requirements; and
  composing, by the local orchestrator of the domain of the plurality of domains, a plurality of devices in the domain of the plurality of domains for performing the workflow portion of the plurality of workflow portions, wherein the composing comprises performing a local optimization based on the additional workflow portion requirements.

* * * * *